(12) United States Patent
Chang et al.

(10) Patent No.: US 7,467,456 B2
(45) Date of Patent: Dec. 23, 2008

(54) METHOD OF ARRANGING A RESOLVER

(75) Inventors: Chia-Ming Chang, Taichung (TW); Chih-Yu Wang, Taichung (TW); Lieh-Feng Huang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 288 days.

(21) Appl. No.: 11/367,167

(22) Filed: Mar. 2, 2006

(65) Prior Publication Data

US 2007/0205761 A1   Sep. 6, 2007

(51) Int. Cl.
*H02K 15/00*   (2006.01)

(52) U.S. Cl. .................. 29/598; 29/596; 29/592.1; 310/67 R; 310/168; 324/207.25; 318/605; 318/661

(58) Field of Classification Search .......... 29/596–598, 29/605–609, 732–735; 310/162, 168, 254, 310/18 B, 12, 67 R, 68 B; 324/207.25, 207.17; 318/661, 716, 807, 254; 385/123; 359/619–626
See application file for complete search history.

(56) References Cited

U.S. PATENT DOCUMENTS

| 4,016,470 | A | * | 4/1977 | Gabor et al. ................. 29/271 |
|---|---|---|---|---|
| 5,250,889 | A | * | 10/1993 | Ezuka ........................ 318/661 |
| 5,486,731 | A | * | 1/1996 | Masaki et al. ............... 310/180 |
| 6,044,545 | A | * | 4/2000 | Ohshita ....................... 29/596 |
| 6,137,204 | A | * | 10/2000 | Kuwahara ................... 310/254 |
| 7,051,421 | B2 | * | 5/2006 | Biais et al. .................... 29/596 |
| 7,075,196 | B1 | * | 7/2006 | Labriola, II .................. 310/65 |
| 7,146,287 | B2 | * | 12/2006 | Kichise et al. .............. 702/151 |
| 7,148,599 | B2 | * | 12/2006 | Aoyama et al. ............. 310/168 |
| 7,199,691 | B2 | * | 4/2007 | Miya .......................... 336/120 |
| 7,347,963 | B2 | * | 3/2008 | Namiki et al. ................ 29/596 |
| 2007/0205761 | A1 | * | 9/2007 | Chang et al. ........... 324/207.25 |

\* cited by examiner

*Primary Examiner*—Minh Trinh
(74) *Attorney, Agent, or Firm*—Charles E. Baxley (57) ABSTRACT

A method of arranging a resolver comprises the steps of: a, setting stator magnetic poles number of the resolver $N_s$ as a number being in integral multiples (t) of a phase number q; b, figuring out rotor magnetic pole number $N_r$ based on a formula; c, arranging the stator and the rotor based on the stator magnetic poles number of the resolver $N_s$ and the rotor magnetic pole number $N_r$, and producing signals with phase differences.

4 Claims, 7 Drawing Sheets

METHOD OF ARRANGING A RESOLVER

BACKGROUND OF THE INVENTION

1. Field of the Invention

The present invention relates to a resolver, and more particularly to resolution adjustable resolver that can be used in a position feedback system for a rotary motor and can adjust the resolution by arranging the stator and rotor magnetic pole numbers at a specific value.

2. Description of the Prior Art

The working principle of a rotary motor is that the current flows to the stator via a transistor 3-phase inverter and a pulse width modulator (POM), producing a rotating magnetic field, and then the rotating magnetic field will interact with the permanent magnet of the rotor and generate a torque. The intention of an electronic commutator is to enable the stator generated magnetic field to be maintained in a vertical direction with respect t to the magnetic field of the rotor's permanent magnet, so as to produce a maximum torque. And this intention should be achieved by the electronic commutator via a resolver's feedback. In other words, it should precisely detect the position of the rotor's magnetic electrodes and transmit the position signal to the driver, and then the driver gives an instruction to actuate the coil winds of the stator, enabling the stator generated magnetic field to be maintained in a vertical direction with respect t to the magnetic field of the rotor's permanent magnet, thus producing a maximum torque.

As disclosed in U.S. Pat. No. 6,137,204, wherein the magnetic poles of the stator are equidistantly arranged, there is a standard regarding the arrangement of stator with respect to the rotor, and increasing the stator magnetic pole number and the rotor magnetic pole number can increase the resolution. However, such arrangement has the following disadvantages:

1, the method of increasing the resolution by increasing the stator magnetic pole number and the rotor magnetic pole number will have difficulties in coil winding. 2, if want to change such structure into a 2-phase circuit from a phase signal, it requires the use of an extra complicated commutation circuit, and only the 3-above times harmonic wave can be eliminated (only odd harmonic wave is eliminated, excluding the first time fundamental wave).

3, the equidistant arrangement greatly restricts the application of the resolver and wastes too much production time.

The present invention has arisen to mitigate and/or obviate the afore-described disadvantages.

SUMMARY OF THE INVENTION

The primary objective of the present invention is to solve the above mentioned problems by providing a method of arranging a resolver that facilitates coil winding, assembly and can provide a high resolution.

The method of arranging a resolver provided in accordance with the present invention comprises the steps of:

a, setting stator magnetic poles number $N_s$ of the resolver as a number being in integral multiples (t) of a phase number q;

b, figuring out rotor magnetic pole number $N_r$, based on the following formula, $$N_s \times \left[\left(\frac{q+1}{q}\right) + \left(n \pm \frac{k}{2}\right)\right] = N_r,$$

where n is the rotor tooth pitch, and k is buffering interval between the stator magnetic poles; and c, arranging the stator and the rotor based on the stator magnetic poles number of the resolver $N_s$ and the rotor magnetic pole number $N_r$, and producing signals with phase differences.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

The foregoing, and additional objects, features and advantages of the present invention will become apparent from the following detailed description of preferred embodiments thereof, taken in conjunction with the accompanying FIGS. 1-9.

Figure 1:
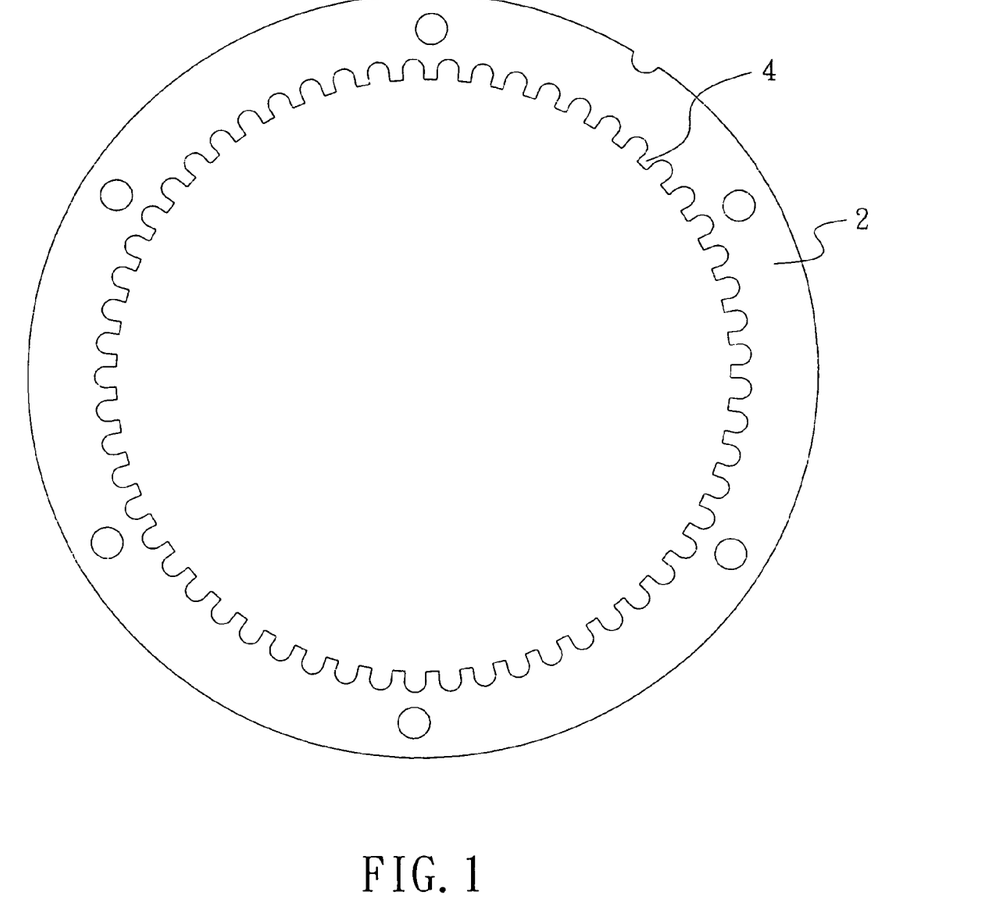
FIG. 1 is an illustrative view of showing a rotor in accordance with an embodiment of the present invention.
Figure 2:
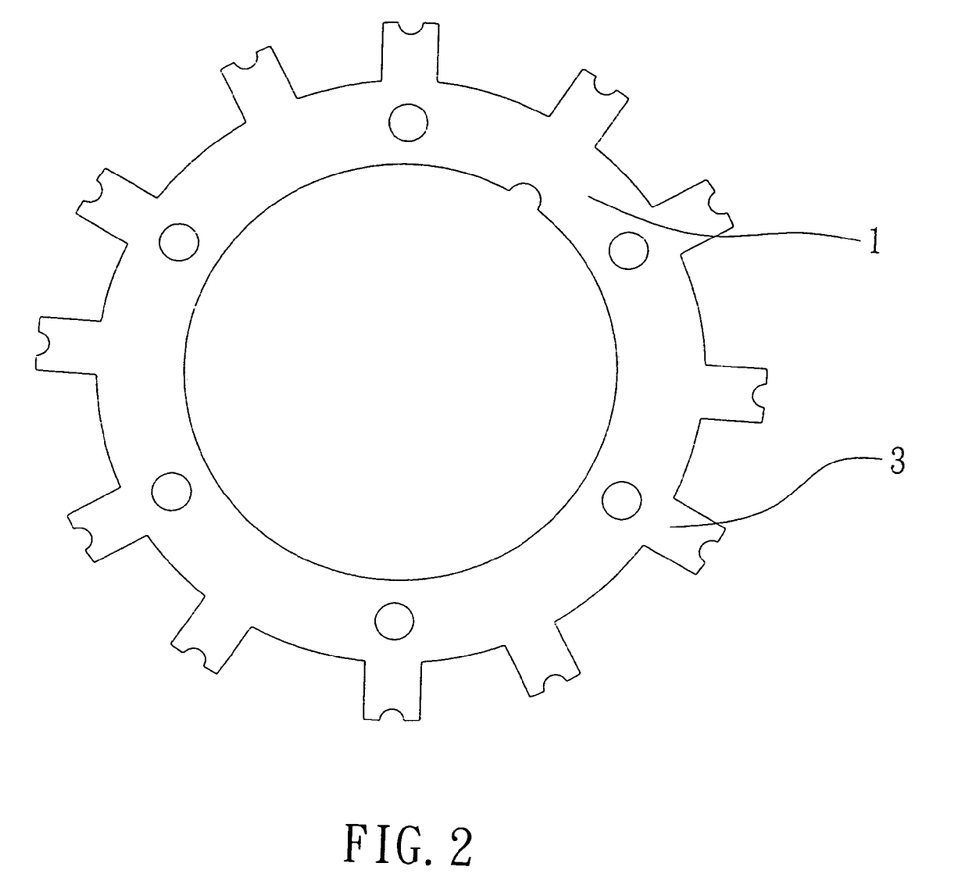
FIG. 2 is an illustrative view of showing a stator in accordance with an embodiment of the present invention.

Referring initially to FIGS. 1 and 2, this embodiment is a 4-phase resolver for example, the stator magnetic number ($N_s$) must be in integral t (t is any arbitrary number) multiples of the phase number (q), and they satisfy the expression as: $N_s = t \times q$. When q=4, t=3, the stator magnetic pole number will be: $N_s = 3 \times 4 = 12$.

Furthermore, the rotor magnetic pole number can be obtained by the expression:

$$N_s \times \left[\left(\frac{q+1}{q}\right) + \left(n \pm \frac{k}{2}\right)\right] = N_r$$

When the phase number q=4, rotor tooth pitch (unit is pitch) n=3, buffering interval k=1, $$N_s \times \left[\frac{(4+1)}{4} + \left(3 \pm \frac{1}{2}\right)\right] = N_r \Longrightarrow N_s \times \left[\frac{(4+1)}{4} + \left(3 \pm \frac{1}{2}\right)\right] =$$

$$N_r \Longrightarrow N_s \times \frac{19}{4} = N_r \Longrightarrow N_s = 12 \text{ and then } N_r = 57$$

Figure 3:
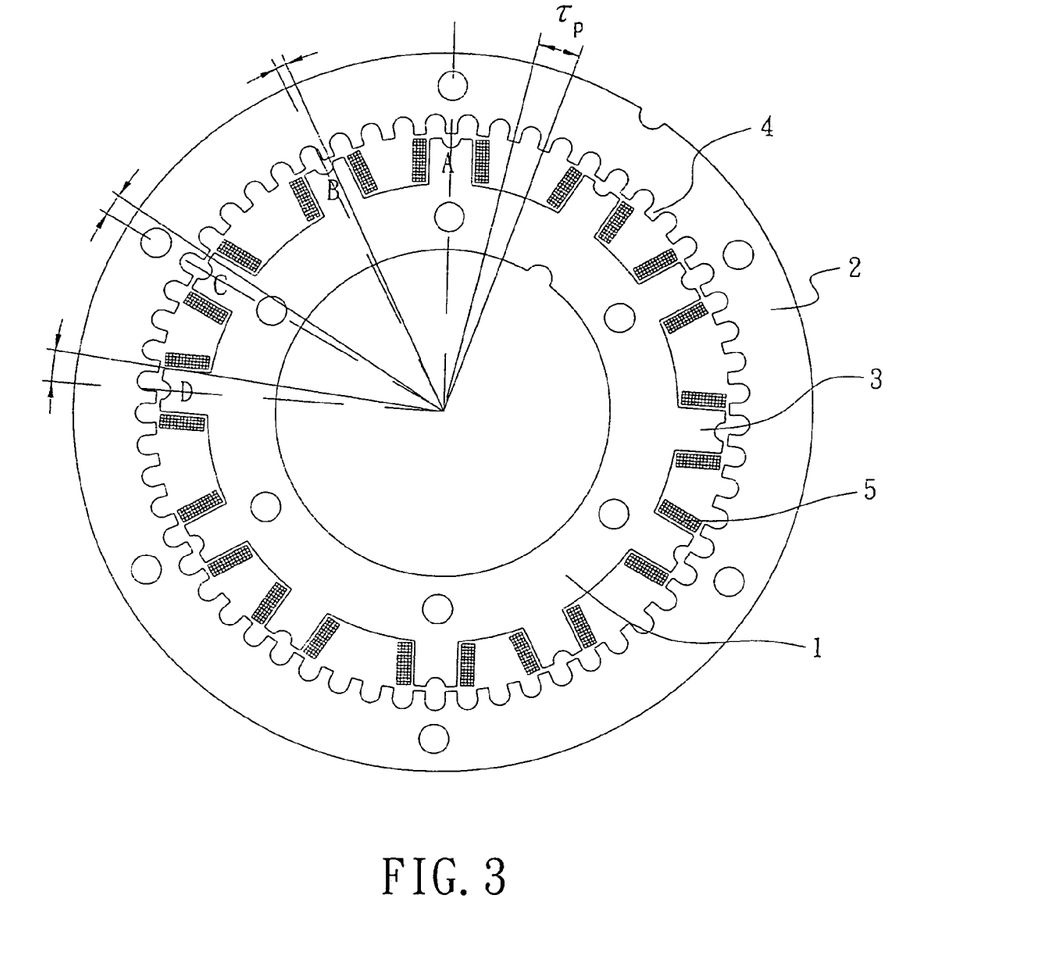
FIG. 3 is an assembly view of the rotor and the stator in accordance with the embodiment of the present invention.
Figure 4:
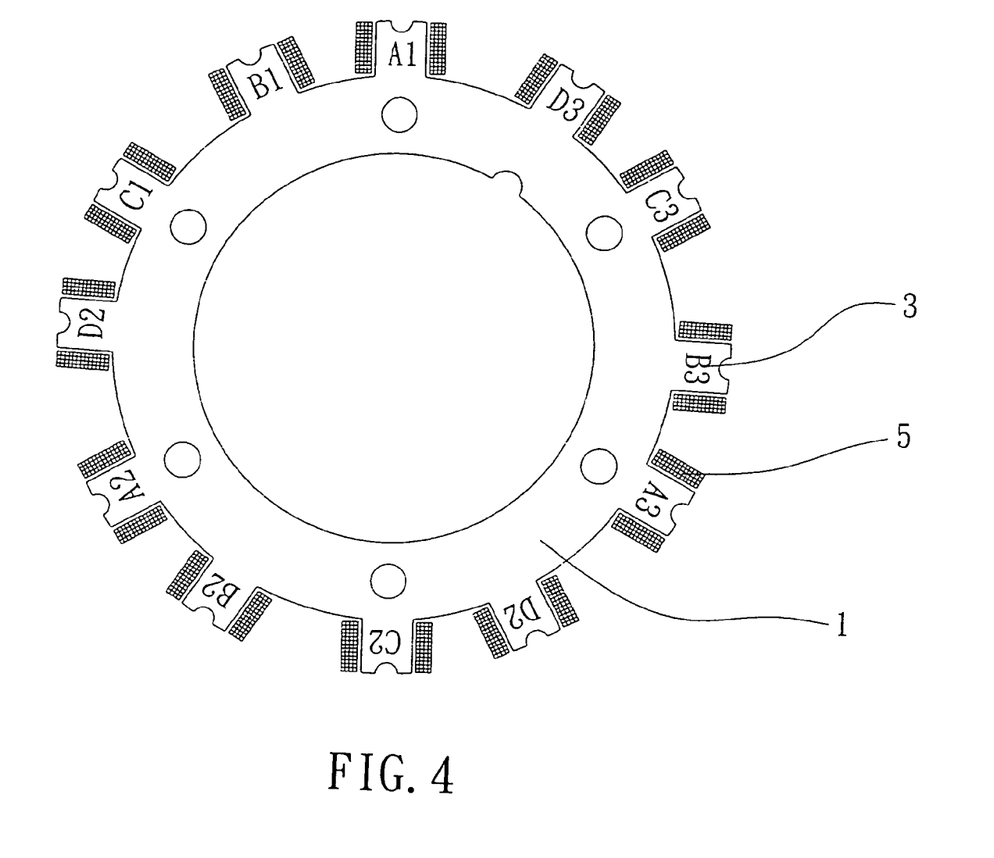
FIG. 4 shows the coil winding in accordance with the embodiment of the present invention.
Figure 5:
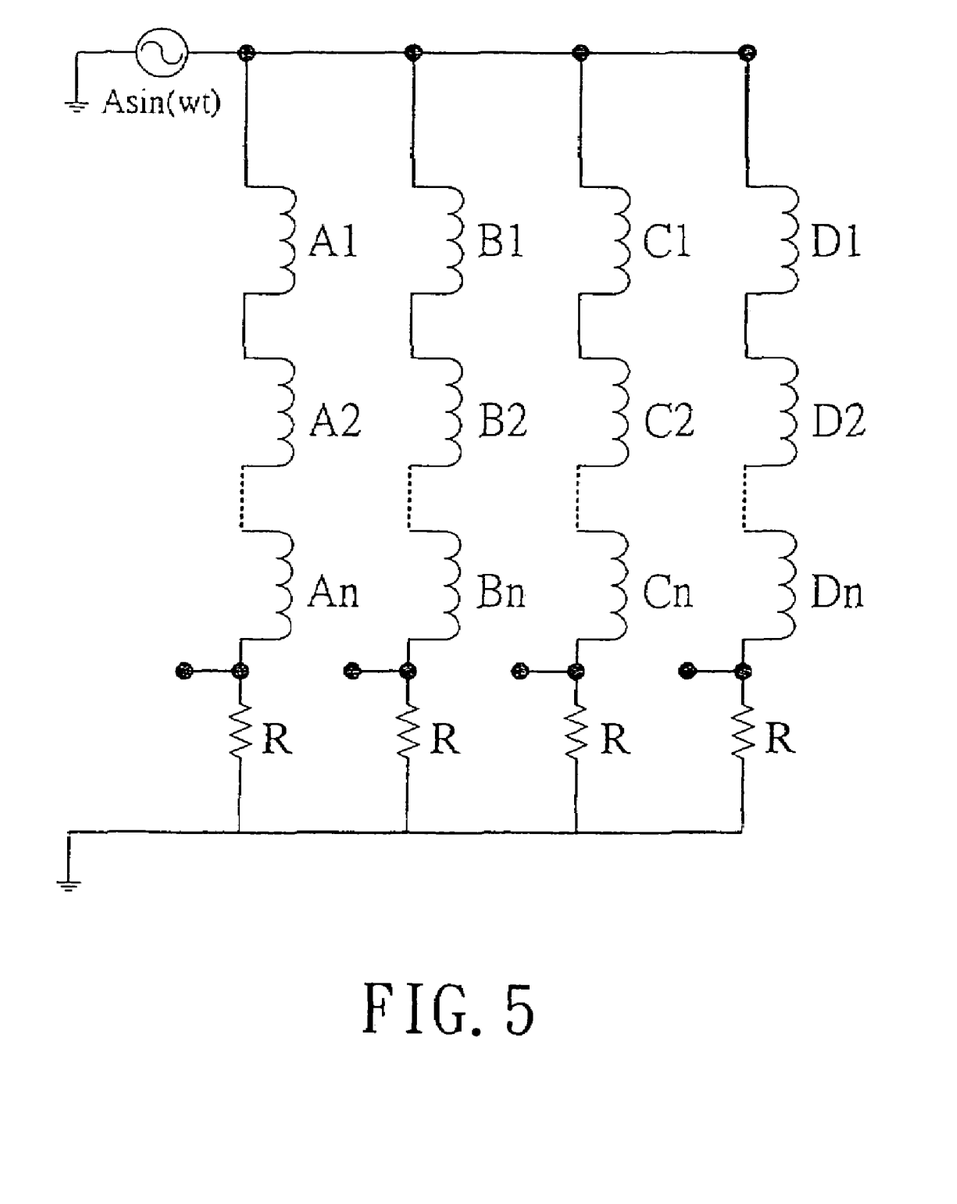
FIG. 5 shows the connections of the coil windings in accordance with the embodiment of the present invention.
Figure 6:
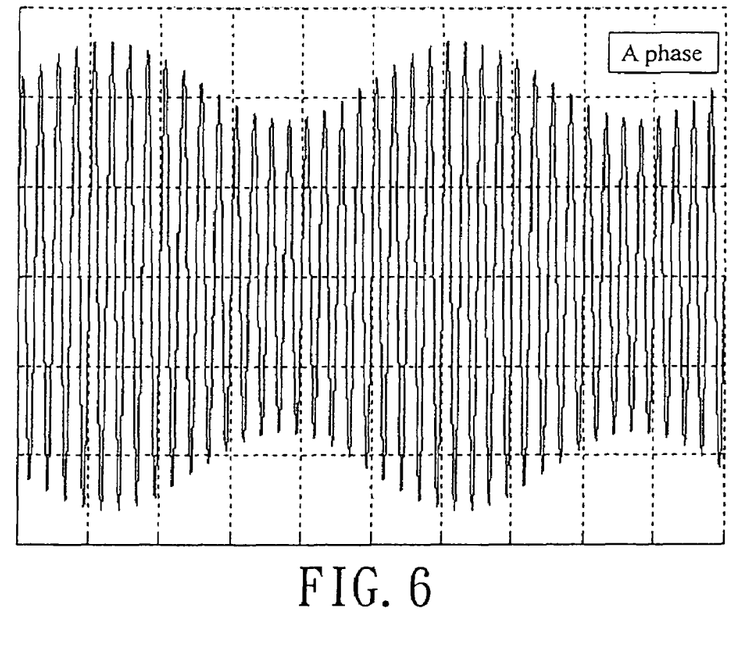
FIG. 6 shows the wave form of A phase in accordance with the embodiment of the present invention.
Figure 7:
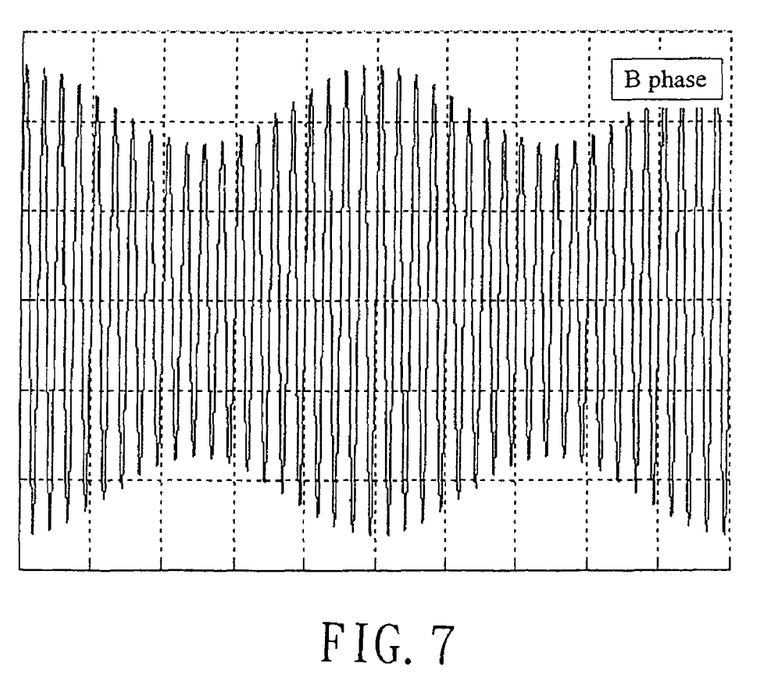
FIG. 7 shows the wave form of B phase in accordance with the embodiment of the present invention.
Figure 8:
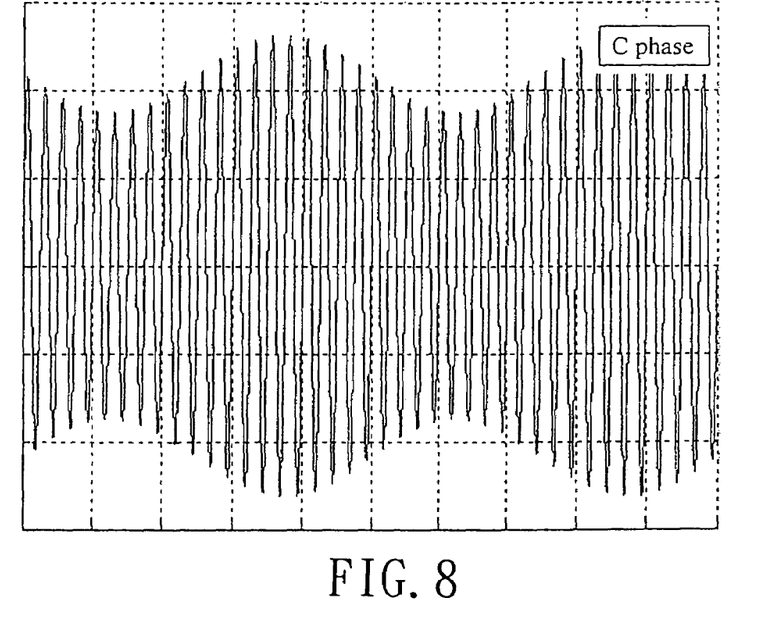
FIG. 8 shows the wave form of C phase in accordance with the embodiment of the present invention.
Figure 9:
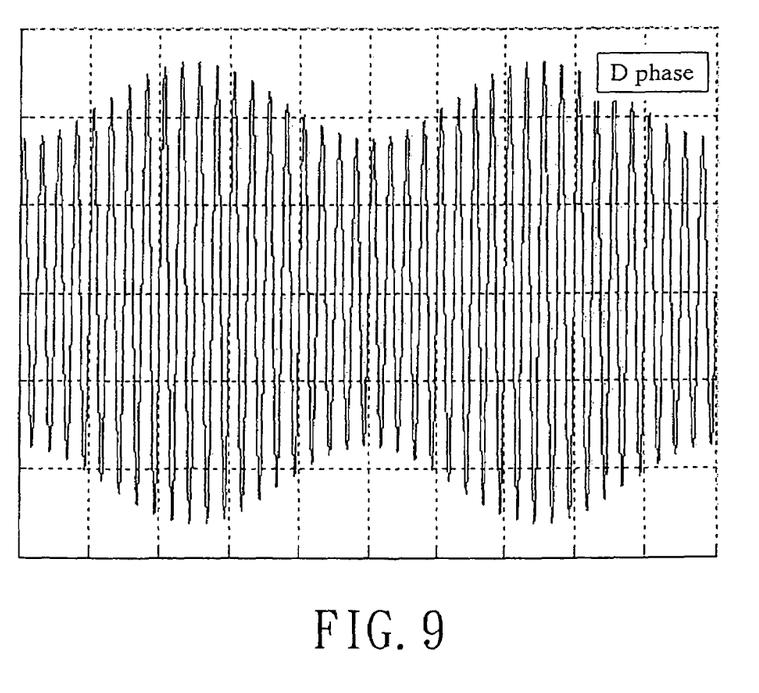
FIG. 9 shows the wave form of D phase in accordance with the embodiment of the present invention.

The stator and rotor magnetic pole numbers obtained from the above mentioned expressions are: $N_s=12$ and $N_r=57$, and the stator and rotor magnetic poles are arranged as shown in FIG. 3, so as to output signals (4-phase) with phase differences of 0°, 90°, 180°, 270°. The four phases are generated at the following different positions:

A phase is generated at 0/4 pitch offset from the center between two rotor magnetic poles 4 and at the center of the stator magnetic poles 3.

B phase is generated at 1/4 pitch offset from the center between two rotor magnetic poles 4 and at the center of the stator magnetic poles 3.

C phase is generated at 2/4 pitch offset from the center between two rotor magnetic poles 4 and at the center of the stator magnetic poles 3.

D phase is generated at 3/4 pitch offset from the center between two rotor magnetic poles 4 and at the center of the stator magnetic poles 3.

After figuring out the position of the A, B, C and D phases, the output signal wave can be obtained by winding methods, that is, the coil windings 5 of the same phase are connected in series and finally each phase is connected in series with a measuring resistance R, and the output signal of the respective phases will be outputted from both ends of the resistances R. As shown in FIGS. 6-9, the signal waves of the respective phases are very smooth.

Some parameters of the arrangement of stator with respect to the rotor are listed in the below table:

$$N_s \times \left[ \left( \frac{q+1}{q} \right) + \left( n \pm \frac{k}{2} \right) \right] = N_r,$$

n is the rotor tooth pitch, when the rotor magnetic pole number is fixed, the greater the value of n, the smaller the stator magnetic pole number, and more coil windings can be accommodated. Likewise, the smaller the value of n, the greater the stator magnetic pole number, and less coil windings can be accommodated. However, the stator magnetic pole number affects the signal's smoothness, and the coil winding number affects the signal strength and the amplitude. Therefore, all these factors must be well adjusted, and then an improved resolution can be obtained.

Furthermore, when the stator magnetic pole number is fixed, k is the buffering intervals between the stator magnetic poles caused by different skip distances, the greater the buffering interval k is, the greater the number of rotor magnetic poles skipped between the stator magnetic poles will be. As a result, the number of rotor magnetic poles distributed around

| Rotor pole number | stator pole number | Phase number | rotor tooth pitch (n) | Buffering interval (k) | stator tooth pitch ($\tau_p$) | Skip distance between A and B (angle) | Skip distance between B and C (angle) | Skip distance between A and C (angle) | Multiples of 360 degrees |
|---|---|---|---|---|---|---|---|---|---|
| 15 | 4 | 4 | 1 | 3 | 24 | 54 | 126 | 180 | 2 |
| 30 | 8 | 4 | 1 | 3 | 12 | 27 | 63 | 90 | 4 |
| 45 | 12 | 4 | 1 | 3 | 8 | 18 | 42 | 60 | 6 |
| 60 | 16 | 4 | 1 | 3 | 6 | 13.5 | 31.5 | 45 | 8 |
| 75 | 20 | 4 | 1 | 3 | 4.8 | 10.8 | 25.2 | 36 | 10 |
| 90 | 24 | 4 | 1 | 3 | 4 | 9 | 21 | 30 | 12 |
| 15 | 4 | 4 | 2 | 1 | 24 | 78 | 102 | 180 | 2 |
| 30 | 8 | 4 | 2 | 1 | 12 | 39 | 51 | 90 | 4 |
| 45 | 12 | 4 | 2 | 1 | 8 | 26 | 34 | 60 | 6 |
| 60 | 16 | 4 | 2 | 1 | 6 | 19.5 | 25.5 | 45 | 8 |
| 75 | 20 | 4 | 2 | 1 | 4.8 | 15.6 | 20.4 | 36 | 10 |
| 90 | 24 | 4 | 2 | 1 | 4 | 13 | 17 | 30 | 12 |
| 25 | 4 | 4 | 3 | 4 | 14.4 | 61.2 | 118.8 | 180 | 2 |
| 50 | 8 | 4 | 3 | 4 | 7.2 | 30.6 | 59.4 | 90 | 4 |
| 75 | 12 | 4 | 3 | 4 | 4.8 | 20.4 | 39.6 | 60 | 6 |
| 100 | 16 | 4 | 3 | 4 | 3.6 | 15.3 | 29.7 | 45 | 8 |
| 25 | 4 | 4 | 4 | 2 | 14.4 | 75.6 | 104.4 | 180 | 2 |
| 50 | 8 | 4 | 4 | 2 | 7.2 | 37.8 | 52.2 | 90 | 4 |
| 75 | 12 | 4 | 4 | 2 | 4.8 | 25.2 | 34.8 | 60 | 6 |
| 100 | 16 | 4 | 4 | 2 | 3.6 | 18.9 | 26.1 | 45 | 8 |

The above table shows that the greater the rotor tooth number, the greater the resolution, and the resolution can be further improved by adjusting the buffering interval.

Skip distance between A and B=Skip distance between A and B=Skip distance between A and B Suppose that the skip distance between A and C is the angle replicated by stator magnetic poles (each two magnetic poles A and B serves as a unit), when the stator magnetic pole number is 12, It will be noted that the phase signal is generated at $$\frac{0 \sim (q-1)}{q}$$

pitch offset from the center between two rotor magnetic poles and at the center of the stator magnetic poles. And in the whole circle will be increased, and the resolution will relatively higher. And likewise, the smaller the number of rotor magnetic poles skipped between the stator magnetic poles is, the lower the resolution will be.

In this way, an unsymmetrical and non-equidistant resolver can be arranged from the above mentioned methods. If the buffering interval k is omitted, and an equidistant resolver can be made based on the above mentioned methods, thus the present invention is more diversified.

To summarize, the present invention has the following advantages:

1, the stator magnetic poles are non-equidistantly arranged, so that the stator magnetic pole number will be decreased, and as a result, the interval between stator magnetic poles will be increased. This allows the coil winding to be performed more easily, and the production cost will substantially reduced.

2, it can be changed into a 2-phase circuit directly by using two subtracters without requiring the use of any commutation circuit, thus the production cost can be reduced effectively.

3, it can eliminate the comparatively low harmony waves, such as 2 times harmony wave, thus improving the output signal and beatifying the signal wave.

4, the resolution can be increased by increasing the rotor magnetic pole number, however, the stator magnetic number unnecessarily increases along with the rotor magnetic pole number, and such arrangement is economical since the structure of the resolver is simplified.

While we have shown and described various embodiments in accordance with the present invention, it should be clear to those skilled in the art that further embodiments may be made without departing from the scope of the present invention.

What is claimed is:

1. A method of arranging a resolver for stator coil winding comprising the steps of:

setting stator magnetic poles number of the resolver $N_s$ as a number being in integral multiples (t) of a phase number (q) by expression as Ns=txq;

figuring out rotor magnetic pole number $N_r$ based on the following formula, $$N_s \times \left[\left(\frac{q+1}{q}\right) + \left(n \pm \frac{k}{2}\right)\right] = N_r,$$

where n is the rotor tooth pitch, and k is buffering interval between the stator magnetic poles;

arranging the stator and the rotor based on the stator magnetic poles number of the resolver $N_s$ and the rotor magnetic pole number $N_r$, and producing signals with phase differences.

2. The method of arranging a resolver as claimed in claim 1, wherein the integral multiple t is a natural number.

3. The method of arranging a resolver as claimed in claim 1, wherein phase signal is generated at $$\frac{0 \sim (q-1)}{q}$$

pitch offset from the center between two rotor magnetic poles and at the center of the stator magnetic poles.

4. The method of arranging a resolver as claimed in claim 1, wherein an equidistant resolver is made by omitting the buffering interval k.

* * * * *